(12) United States Patent
Seyve

(10) Patent No.: US 11,595,564 B2
(45) Date of Patent: Feb. 28, 2023

(54) UNIVERSAL CONTROL INTERFACE FOR CAMERA

(71) Applicant: Christophe Seyve, Saratoga, CA (US)

(72) Inventor: Christophe Seyve, Saratoga, CA (US)

(*) Notice: Subject to any disclaimer, the term of this patent is extended or adjusted under 35 U.S.C. 154(b) by 0 days.

(21) Appl. No.: 17/423,833

(22) PCT Filed: Jan. 18, 2019

(86) PCT No.: PCT/US2019/014222
§ 371 (c)(1),
(2) Date: Jul. 16, 2021

(87) PCT Pub. No.: WO2020/149853
PCT Pub. Date: Jul. 23, 2020

(65) Prior Publication Data
US 2022/0182531 A1     Jun. 9, 2022

(51) Int. Cl.
*H04N 5/232*     (2006.01)
(52) U.S. Cl.
CPC ... *H04N 5/23216* (2013.01); *H04N 5/232935* (2018.08); *H04N 5/232939* (2018.08)
(58) Field of Classification Search
CPC ......... H04N 5/23216; H04N 5/232935; H04N 5/232939
See application file for complete search history.

(56) References Cited

U.S. PATENT DOCUMENTS

| 5,325,147 | A | * | 6/1994 | Kirigaya | G03B 7/097 396/166 |
| 2014/0098273 | A1 | * | 4/2014 | Ito | H04N 5/23216 348/333.03 |
| 2016/0309092 | A1 | * | 10/2016 | Feinberg | H04N 5/2252 |
| 2020/0007787 | A1 | * | 1/2020 | Ueno | H04N 5/232939 |
| 2020/0314348 | A1 | * | 10/2020 | Shimosato | H04N 5/23216 |

FOREIGN PATENT DOCUMENTS

WO    WO 2018/017625    *   1/2018   ............. H04N 5/262

\* cited by examiner

*Primary Examiner* — Kelly L Jerabek
(74) *Attorney, Agent, or Firm* — Duane Morris LLP

(57) ABSTRACT

The present invention relates to a new universal control interface for cameras and other audio-visual recording/using instruments, and more specifically a multi-axis visual interface for simultaneous display and control of aperture (Av), shutter speed (Tv), ISO, and/or other parameters like exposure value (EV). The invention relates to either a triangular, rectangle or clover shape interface where the parameters are visually represented on one of the axis, side or branch of the interface and where the user instead of altering the parameters, will provide intention such as (a) depth-of field, (b) motion blur, (c) granularity, or the composite (d) exposure. The invention further describes how in some cases, one or more of these parameters can be locked or not available based on the technology used for the delay and control interface.

18 Claims, 14 Drawing Sheets

| EV | f-number | | | | | | | | | | | | |
|---|---|---|---|---|---|---|---|---|---|---|---|---|---|
|  | 1.0 | 1.4 | 2.0 | 2.8 | 4.0 | 5.6 | 8.0 | 11 | 16 | 22 | 32 | 45 | 64 |
| -6 | 60 | 2 m | 4 m | 8 m | 16 m | 32 m | 64 m | 128 m | 256 m | 512 m | 1024 m | 2048 m | 4096 m |
| -5 | 30 | 60 | 2 m | 4 m | 8 m | 16 m | 32 m | 64 m | 128 m | 256 m | 512 m | 1024 m | 2048 m |
| -4 | 15 | 30 | 60 | 2 m | 4 m | 8 m | 16 m | 32 m | 64 m | 128 m | 256 m | 512 m | 1024 m |
| -3 | 8 | 15 | 30 | 60 | 2 m | 4 m | 8 m | 16 m | 32 m | 64 m | 128 m | 256 m | 512 m |
| -2 | 4 | 8 | 15 | 30 | 60 | 2 m | 4 m | 8 m | 16 m | 32 m | 64 m | 128 m | 256 m |
| -1 | 2 | 4 | 8 | 15 | 30 | 60 | 2 m | 4 m | 8 m | 16 m | 32 m | 64 m | 128 m |
| 0 | 1 | 2 | 4 | 8 | 15 | 30 | 60 | 2 m | 4 m | 8 m | 16 m | 32 m | 64 m |
| 1 | 1/2 | 1 | 2 | 4 | 8 | 15 | 30 | 60 | 2 m | 4 m | 8 m | 16 m | 32 m |
| 2 | 1/4 | 1/2 | 1 | 2 | 4 | 8 | 15 | 30 | 60 | 2 m | 4 m | 8 m | 16 m |
| 3 | 1/8 | 1/4 | 1/2 | 1 | 2 | 4 | 8 | 15 | 30 | 60 | 2 m | 4 m | 8 m |
| 4 | 1/15 | 1/8 | 1/4 | 1/2 | 1 | 2 | 4 | 8 | 15 | 30 | 60 | 2 m | 4 m |
| 5 | 1/30 | 1/15 | 1/8 | 1/4 | 1/2 | 1 | 2 | 4 | 8 | 15 | 30 | 60 | 2 m |
| 6 | 1/60 | 1/30 | 1/15 | 1/8 | 1/4 | 1/2 | 1 | 2 | 4 | 8 | 15 | 30 | 60 |
| 7 | 1/125 | 1/60 | 1/30 | 1/15 | 1/8 | 1/4 | 1/2 | 1 | 2 | 4 | 8 | 15 | 30 |
| 8 | 1/250 | 1/125 | 1/60 | 1/30 | 1/15 | 1/8 | 1/4 | 1/2 | 1 | 2 | 4 | 8 | 15 |
| 9 | 1/500 | 1/250 | 1/125 | 1/60 | 1/30 | 1/15 | 1/8 | 1/4 | 1/2 | 1 | 2 | 4 | 8 |
| 10 | 1/1000 | 1/500 | 1/250 | 1/125 | 1/60 | 1/30 | 1/15 | 1/8 | 1/4 | 1/2 | 1 | 2 | 4 |
| 11 | 1/2000 | 1/1000 | 1/500 | 1/250 | 1/125 | 1/60 | 1/30 | 1/15 | 1/8 | 1/4 | 1/2 | 1 | 2 |
| 12 | 1/4000 | 1/2000 | 1/1000 | 1/500 | 1/250 | 1/125 | 1/60 | 1/30 | 1/15 | 1/8 | 1/4 | 1/2 | 1 |
| 13 | 1/8000 | 1/4000 | 1/2000 | 1/1000 | 1/500 | 1/250 | 1/125 | 1/60 | 1/30 | 1/15 | 1/8 | 1/4 | 1/2 |
| 14 |  | 1/8000 | 1/4000 | 1/2000 | 1/1000 | 1/500 | 1/250 | 1/125 | 1/60 | 1/30 | 1/15 | 1/8 | 1/4 |
| 15 |  |  | 1/8000 | 1/4000 | 1/2000 | 1/1000 | 1/500 | 1/250 | 1/125 | 1/60 | 1/30 | 1/15 | 1/8 |
| 16 |  |  |  | 1/8000 | 1/4000 | 1/2000 | 1/1000 | 1/500 | 1/250 | 1/125 | 1/60 | 1/30 | 1/15 |
| 17 |  |  |  |  | 1/8000 | 1/4000 | 1/2000 | 1/1000 | 1/500 | 1/250 | 1/125 | 1/60 | 1/30 |
| 18 |  |  |  |  |  | 1/8000 | 1/4000 | 1/2000 | 1/1000 | 1/500 | 1/250 | 1/125 | 1/60 |
| 19 |  |  |  |  |  |  | 1/8000 | 1/4000 | 1/2000 | 1/1000 | 1/500 | 1/250 | 1/125 |
| 20 |  |  |  |  |  |  |  | 1/8000 | 1/4000 | 1/2000 | 1/1000 | 1/500 | 1/250 |
| 21 |  |  |  |  |  |  |  |  | 1/8000 | 1/4000 | 1/2000 | 1/1000 | 1/500 |

FIG. 2

F/4.0    1/125    400 iso

F/3.2    1/250    640 iso

F/4.5    1/60    320 iso

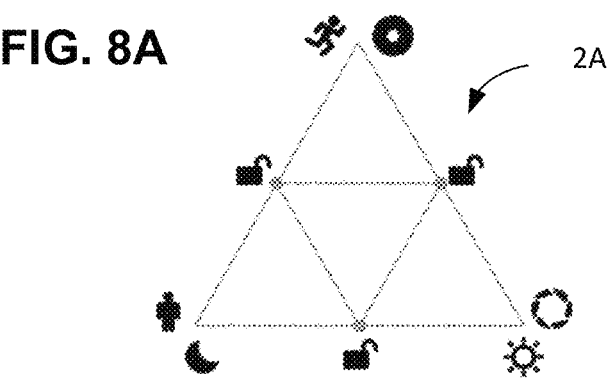
FIG. 8A
F/4.0   1/125   400 iso
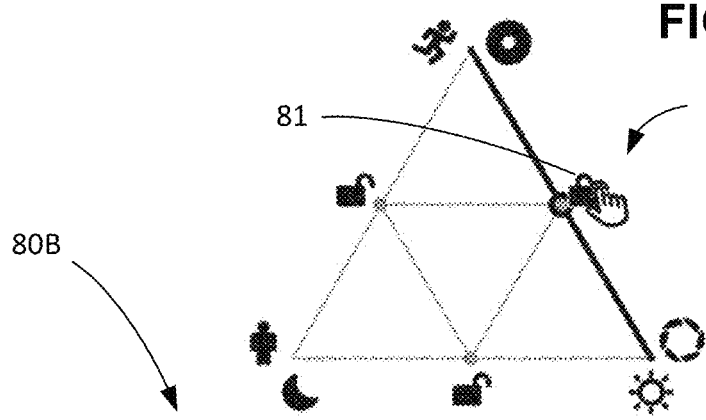
FIG. 8B
F/4.0   1/125   320 iso
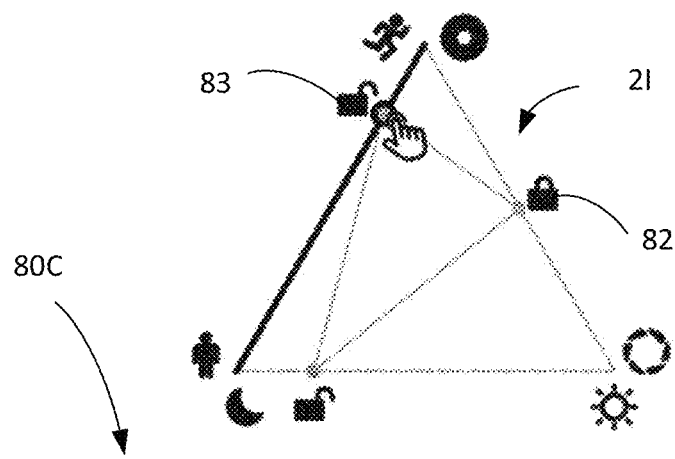
F/4.0   1/500   1280 iso   FIG. 8C

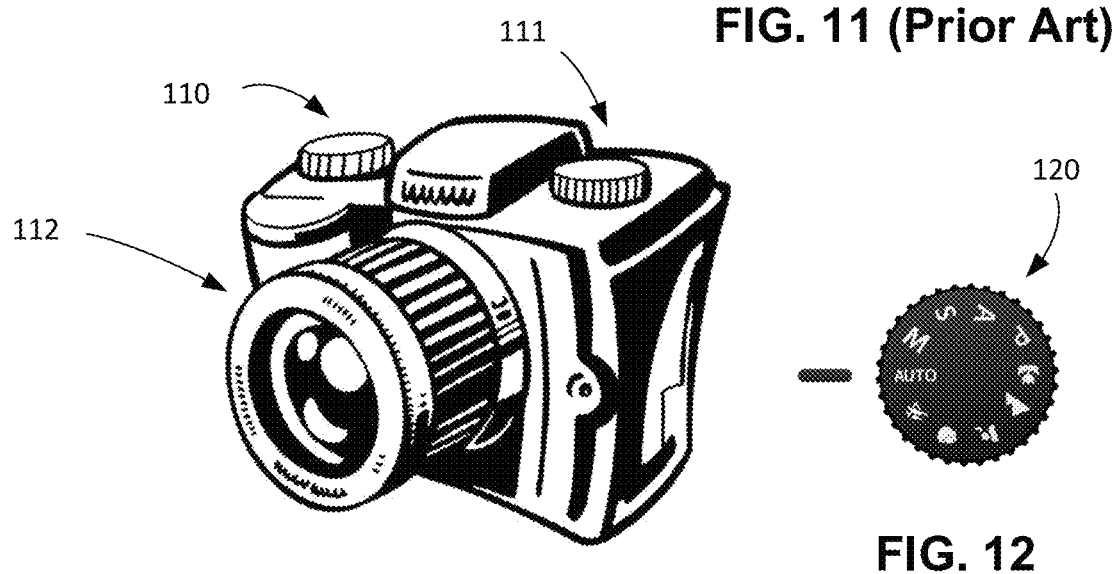
FIG. 11 (Prior Art)
FIG. 12
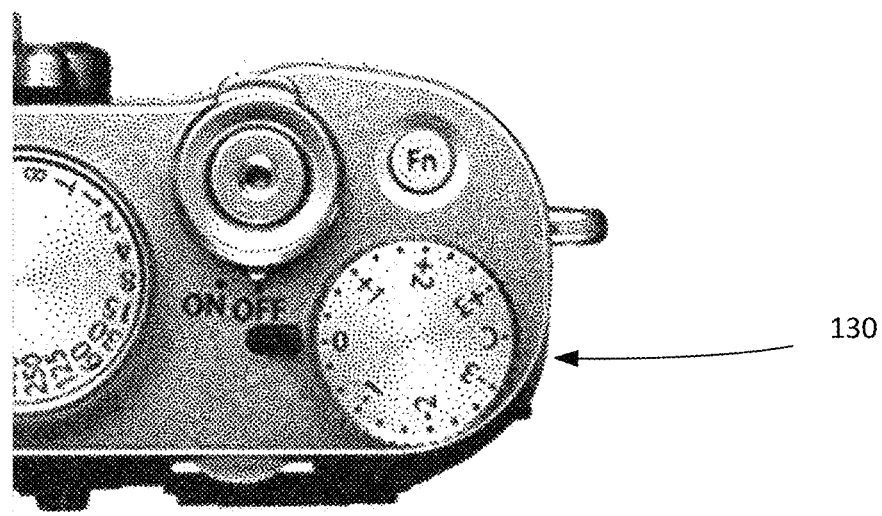
FIG. 13 (Prior Art)

F/2.8    1/1000    1600 iso

F/4.0    1/1250    400 iso

UNIVERSAL CONTROL INTERFACE FOR CAMERA

FIELD OF THE INVENTION

The present invention relates to a new universal control interface for cameras and other audio-visual recording/using instruments, and more specifically a multi-axis visual interface for simultaneous display and control of aperture (Av), shutter speed (Tv), ISO, and/or other parameters like exposure value (EV).

BACKGROUND

We all know the human eye is a wonderfully complex object. Generally speaking, light reflects off an object in nature and enters the eye through the cornea. This is a transparent outer covering of the eye. The cornea bends, or refracts, the rays that pass through the round hole of a pupil. The iris (the colored portion of the eye that surrounds the pupil) opens and closes, making the pupil bigger or smaller. This regulates the aperture of the eye and thus the amount of light that passes through the pupil into the eye. The light then passes through the lens, which changes shape so it can further bend the rays and focus them on the retina. The retina, which sits at the back of the eye, is a thin layer of tissue that contains millions of tiny light-sensing nerve cells. These nerve cells are called rods and cones because of their distinct shapes. Cones are concentrated in the center of the retina, in an area called the macula. When there is bright light, cones provide clear, sharp central vision and detect colors and fine details. Rods are located outside the macula and extend all the way to the outer edge of the retina. They provide peripheral or side vision. Rods also allow the eyes to detect motion and help us see in dim light and at night.

Through evolution, the human eye has evolved to be able to quickly adapt to variations in ambient light, rapid focus of rapidly approaching objects, and even a capacity to adapt to low lighting conditions and enhance vision when night falls. The human eye also is able to operate in extremely complex conditions such as underwater, during rainy days, and even distinguish shapes in fog or cloudy conditions. Mankind has endeavored for centuries to create devices which not only are able to observe and record this dynamic and complex world, but also when possible create tools that allow photographers, users, and videographers to quickly interface with a sensor-wielding device to be able to record in a maximum of conditions.

In the mid-1820s, Nicephore Niepce first managed to fix an image that was captured with a camera but eight hours or even several days of exposure of a film in a box were required and the earliest results were very crude. In 1839, modern photography was born Louis Daguerre went on to develop the daguerreotype process in which minutes only are required to imprint on metal an image. The process quickly evolved to calotype negatives and salt print. Quickly, the process focused on rapid exposures (less than 1 second) onto a roll of film. U.S. Pat. No. 355,084 patented on Dec. 28, 1886 was sold by inventor Houston to Eastman which utilized a box and a film rolled for multiple images in sequence on a film.

During the next century, from 1890 to 1990, the field is generally known as analog photography where a progressively changing recording medium, which can be either a chemical process like a photographic film or plate or an electronic process like a CCD sensor slowly records images. Recently, the field of image capture has evolved to digital photography where cameras use arrays of electronic photodetectors to capture images focused by a lens as opposed to an exposure on photographic film. Understandably, after more than a century of use of analog photography, most of the terminology and limitations have been kept to new digital photography.

The inventor, for example points to U.S. Pat. No. 5,049,919 titled Automatic Optimization of Photographic Exposure Parameters Through Determination and Utilization of Extra System Speed, a patent owned by the Eastman Kodak Company. As shown at FIG. 1 from this prior art (also FIG. 1 in this reference), this figure depicts density vs. log exposure, granularity vs. log exposure, relative saturation vs. log exposure, and modulation transfer at 15 cycles/mm vs. log exposure characteristics for a single layer of a typical photographic color negative print film that could be used with this inventive process. This reference is incorporated herein by reference to help provide further context and understanding to the field of photography generally. This invention relates to improvement of a camera by automatic selection of photographic exposure parameters primarily based upon scene requirements.

In parts, this very long reference is very helpful in describing and using (a) aperture opening values, (b) shutter speed quantification, and (c) what is called ISO values. For example, in part the specification reads, "[t]herefore, the exposure settings of $1/100$th second for shutter speed and an f/8 aperture would be sufficient to meet the scene requirements and hence provide sufficient system speed necessary to photograph the subject on a cloudy day. Now, at this point, assume that instead of using ISO (ASA) speed 100 film, ISO (ASA) speed 400 film is to be used. This latter film only requires $1/4$ of the available light needed by the ISO (ASA) 100 film to provide the same exposure density on a negative. This allows use of faster shutter speeds or decreased lens apertures. Specifically, if the exposure settings defined by the ISO/ANSI exposure standards were to be simple-mindedly followed as occurs in automated cameras known in the art, then, if the shutter speed were kept constant at $1/100$th second, quadrupling the available film speed would necessitate that the lens aperture be decreased by two stops, i.e. from f/8 to f/16. At an f/16 lens aperture, the depth-of-field would increase from 5 to 15 feet to illustratively 3 to 30 feet (approximately 0.9 to 9 m). Though the depth-of-field has dramatically increased to well beyond that required by the scene to obtain an ISO standard exposure, the additional depth-of-field is simply not necessary for this scene. Inasmuch as the scene requirements would all be met at a shutter speed of $1/100$th second and an f/8 lens aperture, advancing the lens aperture by two stops to f/16 to obtain additional depth-of-field will not yield a noticeable improvement in image quality in this photographic situation. The extra system speed, being the difference in log exposure between that which is currently available and that which the scene actually requires, as dictated typically by the ISO/ANSI exposure standards, amounts to two stops in this situation. Since image quality is affected by a variety of parameters, only one of which is depth-of-field, the two stops of extra system speed can be used in another way, one that is likely in this case to actually improve image quality. For example, if, on the one hand, the ISO (ASA) 400 speed film exhibits a noticeable quality improvement with over-exposure, e.g. decreasing graininess with increased sharpness and color rendition, then the $1/100$th second shutter speed and the f/8 aperture settings could be used to retain the required depth-of-field but the film would be intentionally over-exposed by two stops to improve image quality over that which would result from an ISO normal exposure. If, on the other hand, the film does not exhibit an quality improvement with over-exposure, then the two stops of extra system speed could be used, as described below, in a different manner to improve image quality, such as by illustratively using a faster shutter time in order to further reduce image blur attributable to camera shake."

Since understanding these three key parameters is at the heart of this invention, the Inventor further plains that as an "aperture" often considered the most important measure in photography. The aperture is a hole within a lens, through which light travels into the camera body. Controlling the size of the eye's aperture is a pupil. As the aperture changes, more or less light reaches the camera sensor. Apertures have several effects in photography, the most important is brightness, or exposure of images. As apertures change in size, they alter the overall amount of light that reaches a camera sensor. A large aperture (a wide opening) will pass a lot of light. In dark environments, for example, such as indoors or at night, a photographer may find interest in widening the aperture. Pupils of the human body dilate (i.e. open) when it starts to get dark for this reason. Another critical effect of aperture is something known as depth of field. This is the sharpness variability from front to back (i.e. the front is fuzzy and the distant is fuzzy having sharpness in a midpoint of interest). A large aperture creates a large amount of background blur creating often what is called a shallow depth of field. Aperture size is defined by the "f-number" or the "f-stop." A value of aperture is often indicated by f8 or f/8 depending on the displays. Non integral numbers also can be used for f-number, such as f/3.5. As part of photography, the larger the f-number, the smaller the aperture. The following table offers a good understanding of aperture:

| | Aperture Size | Exposure | Depth of Field |
|---|---|---|---|
| f/1.4 | Very large | Lets in a lot of light | Very thin |
| f/2.0 or f/2 | Large | Half as much as f/1.4 | Thin |
| f/2.8 | Large | Half as much as f/2 | Thin |
| f/4.0 of f/4 | Moderate | Half as much as f/2.8 | Moderate thin |
| f/5.6 | Moderate | Half as much as f/4 | Moderate |
| f/8.0 or f/8 | Moderate | Half as much as f/5.6 | Moderate large |
| f/11.0 or f/11 | Small | Half as much as f/8 | Large |
| f/16.0 or f/16 | Small | Half as much as f/11 | Large |
| f/22.0 or f/22 | Very small | Half as much as f/16 | Very Large |

In most photography equipment, both automatic and manual modes can be used to modify the value of the f-number with each picture. An aperture-priority mode can be selected and named often as "A" or "Av" on most cameras. Manual aperture modification mode is often referred to as "M" simply. In the aperture-priority mode, the camera will select both a shutter speed (see below) and align the aperture alongside based on a simple table of value or a simply algorithm as shown at FIG. 1 from the prior art. In the art, a "fast" lens will have a very wide maximum aperture or f/1.4 to f/1.8 while a slow lens will have a maximum aperture of f/4. In normal lenses, as the zoom is used, apertures will change but on more expensive lenses, as zoom ranges are changed, the aperture will remain fixed.

Shutter speed is also one of the three key metrics in modern analog and digital photography. Shutter speeds define two things in most images, the brightness and dramatic effects such as freezing action or blurring motions. A shutter speed is defined as the time interval when the shutter is open in seconds. Shutter speeds of ¼ means a quarter of a second, while 1/250 means one two-hundred-and-fiftieth of a second (or four milliseconds). Most modern DSLRs and mirrorless cameras can handle shutter speeds of up to $1/4000^{th}$ of a second. The longest a shutter is open, the lighter hits a sensor and increases the brightness. So trying to capture a very fast moving object by using high shutter speeds often results in an impossible drop in luminosity (i.e. dark pictures). Photography of animals require at least a $1/1000^{th}$ shutter speed or faster, but for normal slower-moving objects, a speed of $1/200^{th}$ or $1/100^{th}$ is often enough to avoid blur. When very slow shutter speeds are used, the camera and/or the shutter must avoid movement. Either vibration reduction technologies can be used or the apparatus can be fixed on a stand to avoid movement. Shutter speeds can be adjusted either by placing the camera at "Shutter Priority" mode often as "Tv" or "S" on most cameras, or by using the manual mode "M."

Finally, the third pillar of photography is called the camera ISO. ISO is a value based on the quantity of grains or light points on any given surface and while having more grains of light controls brightness of photos, the immediate side effect is the increase of what is called "noise" in photography. Low ISO value are about 100 while high ISO value is often at 6400. ISO 200 will be twice as bright as ISO 100 and ISO 400 will be four time brighter than ISO 100. Most cameras have what is called a "base ISO" often in the range of 200 for analog devices and 100 for new digital cameras. ISO setting are often modified in a mode that lets a person change the setting like Manual, Shutter Priority, or Aperture Priority (in Auto Mode, ISO often cannot be changed). In certain mirrorless cameras, a quick menu often offers ISO change selections. In some high range cameras, an ISO option is directly given.

Above, three components (Av, Tv, and ISO) are given, a fourth additional value called the Exposure Value (EV). For example, U.S. Pat. No. 4,309,089, from Donald Harvey, from Eastman Kodak Co., described in 1977 what was called an exposure indicating apparatus responsive to film exposure latitude. Part of this reference explains, "[w]ith many negative films, acceptable photographs may be achieved even though the film is overexposed or underexposed from what might be considered an "optimum" exposure. Some films of this type, for example, may be overexposed up to the equivalent of three exposure values, or underexposed the equivalent of two exposure values, yet an acceptable photograph will be produced. Using these films, one camera setting will suffice for many normally encountered scene conditions. For example, a camera using a particular negative film may be set for an exposure appropriate for overcast or open shade conditions and still acceptably accommodate exposure conditions ranging from bright indoor daylight scenes to summer sunlight scenes. In effect, there exists, instead of a discrete "optimum" exposure, a "window", constituting a range of exposures, appropriate for the film being utilized, that produces satisfactory photographs. As long as the camera is adjusted to produce an exposure within this "window", the camera operator may make photographs without concern for certain departures from the "optimum" exposure." As described, often the value will range from a negative scale (as low as −6 EV) to a positive scale (+21 EV). A table, given as FIG. 2 offers a possible set of exposure times, in seconds or minutes (m) for various exposure values (EV) and f-numbers.

In photography, the mode P "Program" is used as a semi-automatic mode with a possible override from the user. The auto-exposure chooses a couple (shutter speed, aperture+ISO if set to automatic) that gives a well exposed picture. Then, the photographer can change synchronously the distribution of speed/aperture by rotating a dial: both aperture and shutter speed move in opposite directions for their contribution to the quantity of light received by the sensor or the film: when the aperture closes by one step, the exposure time increases by one step.

In one known system, an initial auto-exposure set could be S=$1/125^{th}$ s, f/4, and 400 ISO. If the user shifts 1 stop (meaning doubles the contribution) in one direction, the parameters are adjusted to S=$1/250$ s (twice less from the exposure time, twice shorter) and f/2.8 (the surface of the aperture doubles, so twice more light goes through the lens). If the dial is moved in the other direction, the values change to S=$1/60$ s, and f/5.6, meaning exposure time doubles, and the surface of aperture is divided by 2.

| Dial Position | Shutter Speed (S) | Aperture (f/) | ISO |
|---|---|---|---|
| Left 1 Increment | $1/250^{th}$ s | f/2.8 | 400 |
| Center | $1/125^{th}$ s | f/4 | 400 |
| Right 1 Increment | $1/60^{th}$ s | f/5.6 | 400 |

In the above example, if the user wants shorter exposure time because the subject is moving or if he wants less depth of field to get a blurrier background, he uses the first direction (Left 1 Increment). On the other hand, if he wants more depth of field or a longer exposure time to get a motion trail, he can choose the other direction (Right 1 Increment). This shift is usually done with a physical control such as a crown dial. It can also be done on a tactile surface (screen or capacitive sensor) by swiping. But in both cases, the camera does not know the intention of the photographer, since both parameters are moved. On the other hand, a lot of photographers don't use this mode because they don't really understand if it's an auto mode or a manual mode. And if they use it, they might not understand its behavior sometimes.

The behavior of fixing ISO sensitivity is inherited from the age of analog photography, since the fixed ISO sensitivity of the film was imposing to balance between the two parameters aperture and speed. Having fixed ISO, upon modification by the photographer, it was impossible for the system to deduce the intent. Was a change from S=$1/125$ s and f/4 in aperture to the set S=$1/60$ s and f/5.6, to change motion blur or because the photographer wanted more depth-of-field. By changing the ISO, the photographer could have obtained more depth of field without risking motion blur by increasing the ISO to compensate for the increase of light. This would result for example in the following initial parameters: $1/125$ s, f/4, 400 iso, to the following amended parameters: $1/125$ s, F/5.6, 800 iso. In this case, the intention of the photographer can be ascertained as the speed remains fixed and the aperture, not on the speed, is changed. On normal photography dials, as shown at FIGS. 11-13, if the photographer desires to keep the shutter speed at $1/125$ s, and move the aperture to f/5.6 along with a change of ISO from 400 to 800, this individual would need to: (a) either switch to Aperture priority mode, (b) select f/5.6 with the main dial, (c) go to the settings and set ISO 800, then (d) the auto-exposure should propose $1/125$ s. In this set, at least four actions are required which is time consuming, a very key component of photography is the speed a photographer can set the desired settings. In a second scenario, the above changes can be made by moving (a) to Manual mode, (b) copy the parameter, (c) set aperture to f/5.6 with one dial, (d) set the shutter speed with another dial or a key+main dial, then € change the ISO by pressing the ISO selection key and changing the value with a dial or the screen.

In practice, most of the advanced photographers use either Shutter speed priority (called S or Tv) or Aperture priority (A or Av) modes according to their main preoccupation: S for motion related and A for depth-of-field related. Moreover, those kind of choices are usually well done only by advanced photographers, the majority operates the dial to switch one parameters (for ex the aperture) without really being aware on the impact on the speed. For example, a photographer wants to shoot a nice building architecture, he will want more depth of field by shifting the aperture from f/2.8 to f/5.6. He will rotate the dial and stop when the aperture is f/5.6 in the viewfinder screen. But the P mode this will multiply the exposure time (S) by 4, and as an undesired consequence, he might get a blurry picture.

What is needed is a new dynamic and static way and associated interface of approaching the control of the different components of exposure that allows for a more efficient way to manage a couple or more of these different components, namely the shutter speed (S), the aperture (f/), the ISO value, and/or the exposure value (EV) in a more coherent and efficient way. Also, what is needed is a better tool to more easily manage these variables in a way that more closely and quickly reflect the needs of photography.

SUMMARY

The present invention relates to a new universal control interface for cameras and other audio-visual recording/using instruments, and more specifically a multi-axis visual interface for simultaneous display and control of aperture (Av), shutter speed (Tv), ISO, and/or other parameters like exposure value (EV). The invention relates to either a triangular, rectangle or clover shape interface where the parameters are visually represented on one of the axis, side or branch of the interface and where the user instead of altering the parameters, will provide intention such as (a) depth-of field, (b) motion blur, (c) granularity, or the composite (d) exposure. The invention further describes how in some cases, one or more of these parameters can be locked or not available based on the technology used for the delay and control interface.

BRIEF DESCRIPTION OF THE DRAWINGS

Certain embodiments are shown in the drawings. However, it is understood that the present disclosure is not limited to the arrangements and instrumentality shown in the attached drawings.

FIG. 2 is an illustration from the prior art illustrating for EV and f-number the different exposition times.

FIGS. 8A-8C are three consecutive illustrations of the new universal control interface for camera shown at FIG. 4 where a user locks the value of aperture and varies one or more of the two other parameters according to one embodiment of the present disclosure.

FIG. 11 is an illustration showing the different elements currently used on one type of camera from the prior art to regulate or control the different parameters being controlled by the interface shown at FIG. 4.

FIG. 12 is a close-up illustration of the main control wheel for the regulation of a camera from the prior art.

FIG. 13 is a close-up illustration of a EV dial control wheel for the regulation of a camera from the prior art.

DETAILED DESCRIPTION

Figure 1:
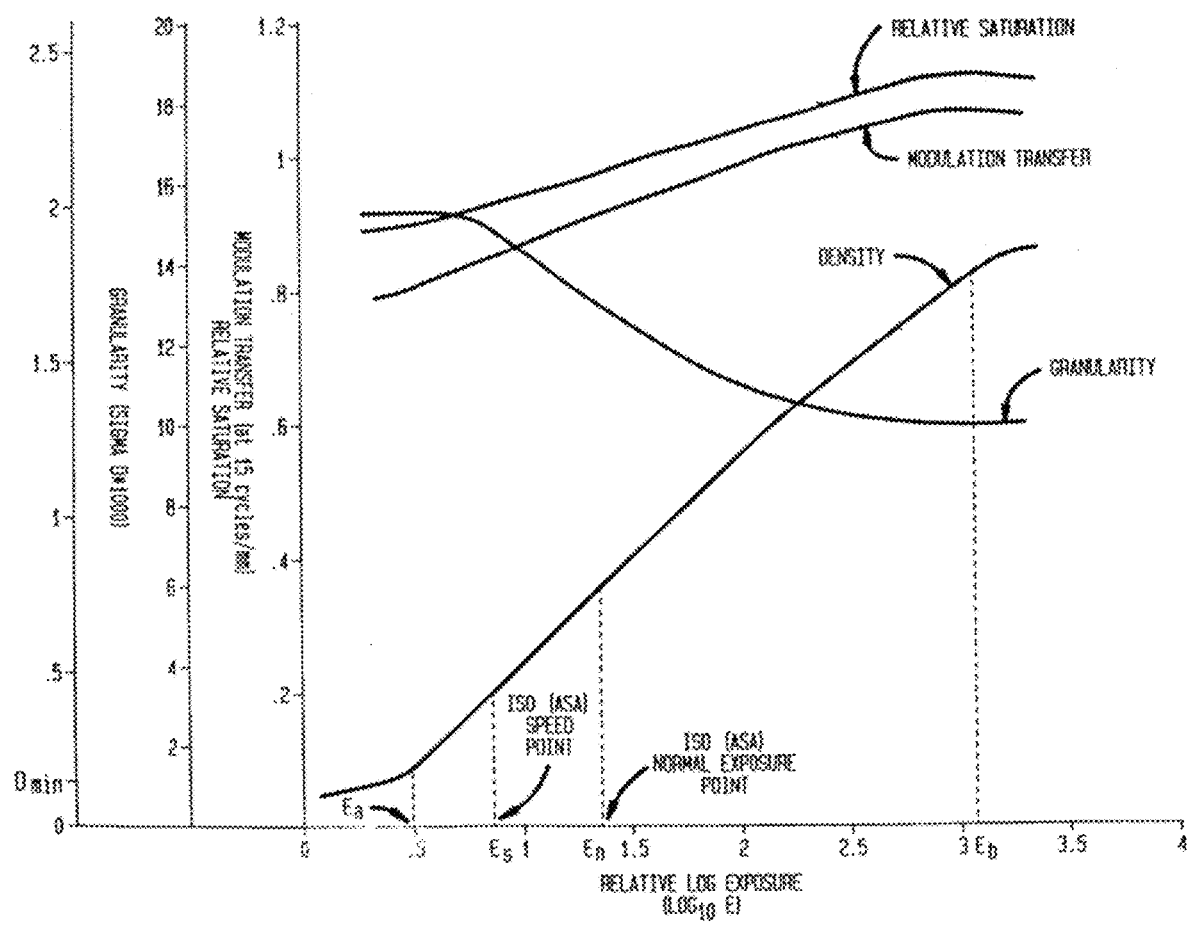
FIG. 1 is an illustration from U.S. Pat. No. 5,049,919 from the prior art.

For the purposes of promoting and understanding the principles disclosed herein, reference is now made to the preferred embodiments illustrated in the drawings, and specific language is used to describe the same. It is nevertheless understood that no limitation of the scope of the invention is hereby intended. Such alterations and further modifications in the illustrated devices and such further applications of the principles disclosed and illustrated herein are contemplated as would normally occur to one skilled in the art to which this disclosure relates.

Figure 3:
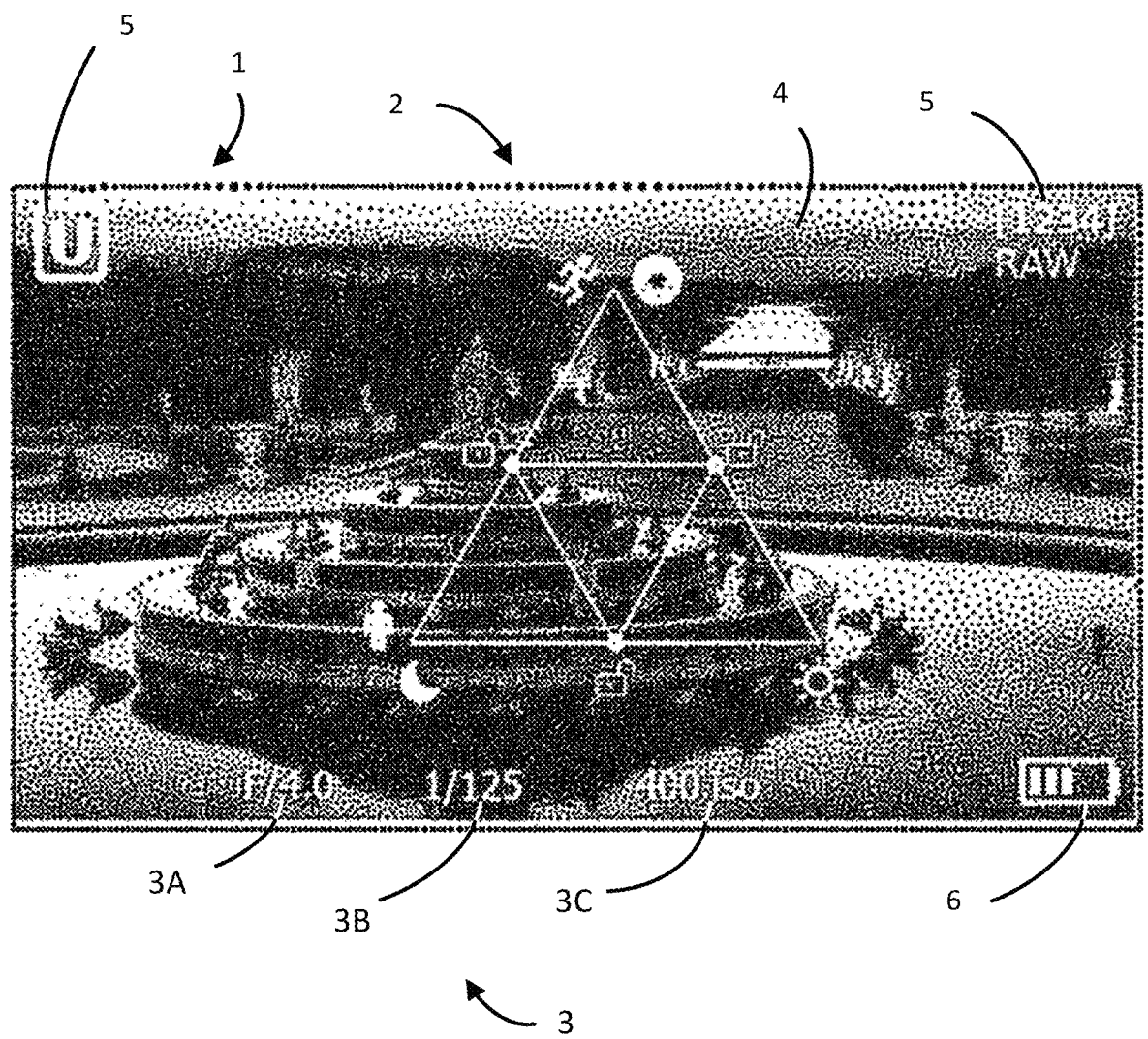
FIG. 3 a general representation of one of the new universal control interface for camera on a sample screen according to an embodiment of the present invention.
Figure 9:
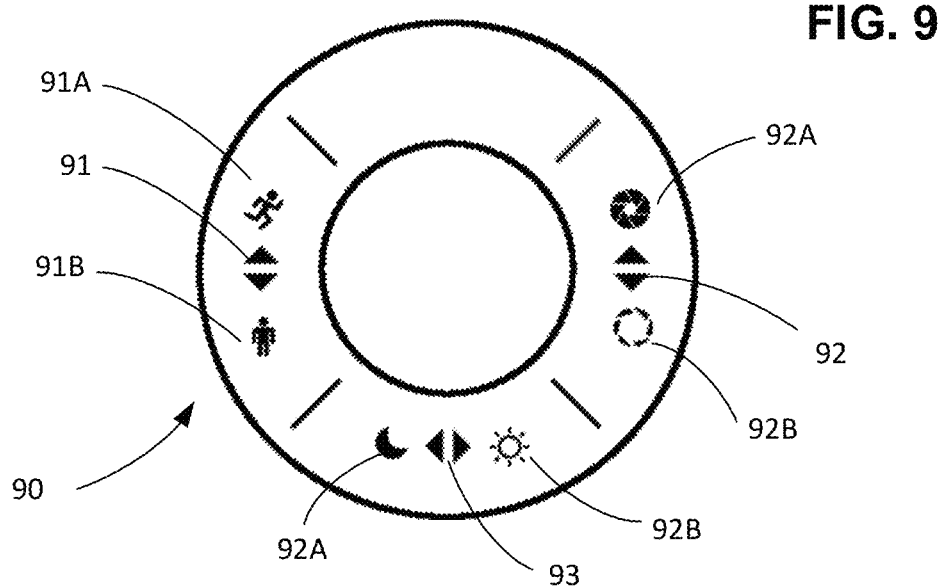
FIG. 9 is an illustration of a thumb-wheel interface for modulating or changing the values of aperture, shutter speed or ISO on the interface shown at FIG. 4 or any other embodiment from this disclosure.
Figure 10:
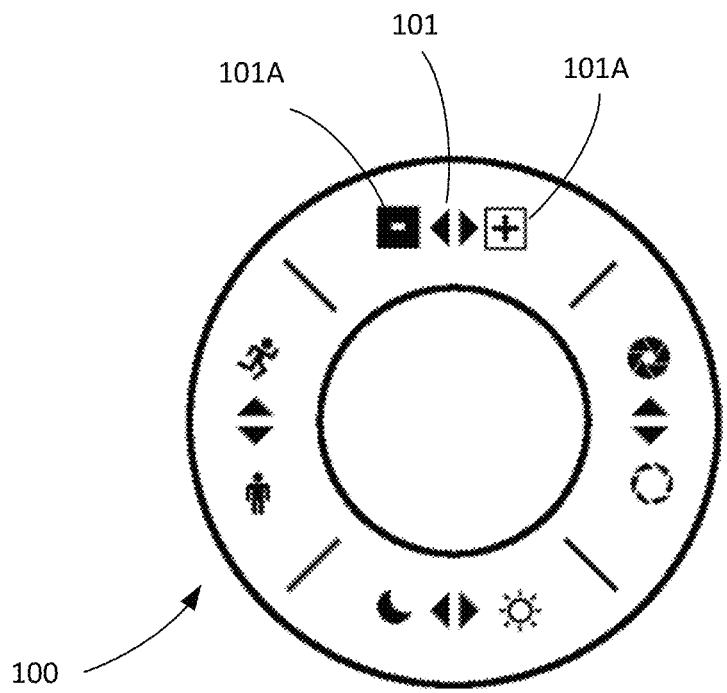
FIG. 10 is an illustration of the thumb-wheel interface for modulating or changing the values of aperture of FIG. 9 where the value of EV has been added as a fourth parameter to control the interface shown at FIG. 15 or any other embodiment from this disclosure.

This invention is a new way of approaching the control of the different components linked with imagery and photography. What is described herein is a new way for a user interaction and a physical control, through a tactile screen as shown at FIG. 3 or a click+wheel pad as shown at FIGS. 9-10 to easily and quickly manage and amend the different parameters linked with analog and digital photography and videography. Today's cameras are still designed in the paradigm of the analog photography world which result limitations and problems in quick adaptation to modern needs. Originally, since the medium, like a film was a drive which fixed ISO sensitivity, the resulting systems were designed and implemented to manage and impose rapid balance between the two parameters such as aperture (Av) and speed (S).

As will be explained later, the current description describes a visual interface, often displayed on a screen or other display either via touch-screen or any other tactile control created by a software residing in hardware. While the coding of the software is not described herein, one of ordinary skill in the art of programming of software interface will understand how to implement and use the below-described features to create, without undue experimentation the invention implemented as part of a stand-alone camera or as part of a pre- or post-processing system residing in a cell phone, a computer, or any other media of control for a photography system.

As shown at FIG. 3, a general representation 1 of one of the new universal control interface 2 for camera or camera screen 5 according to an embodiment of the present invention. As represented, the control interface 2 can be superimposed upon a "live" image 4 displayed in the background which allows a photographer to modify as will be shown in the following figures the image. Also as shown, the display can include other key metrics 5, 6 which are known to photographers and generally unrelated to the current invention. In contrast, as shown the metrics 3A, 3B, and 3C can be directly relevant with the current new interface 2. In this case, f/4.0 is the set aperture, S=$1/125$ is the set shutter speed, and 400 iso is the set ISO value which results in the image 4 in the background. While the inventor offers the redundancy of the settings as displayed 3 (3A, 3B, and 3C) next to the interface 2 shown with greater, one of ordinary skill in the art will understand that in alternate embodiments, the displayed information 3 can be removed or additional ways of displaying the information on these parameters can be offered.

Figure 4:
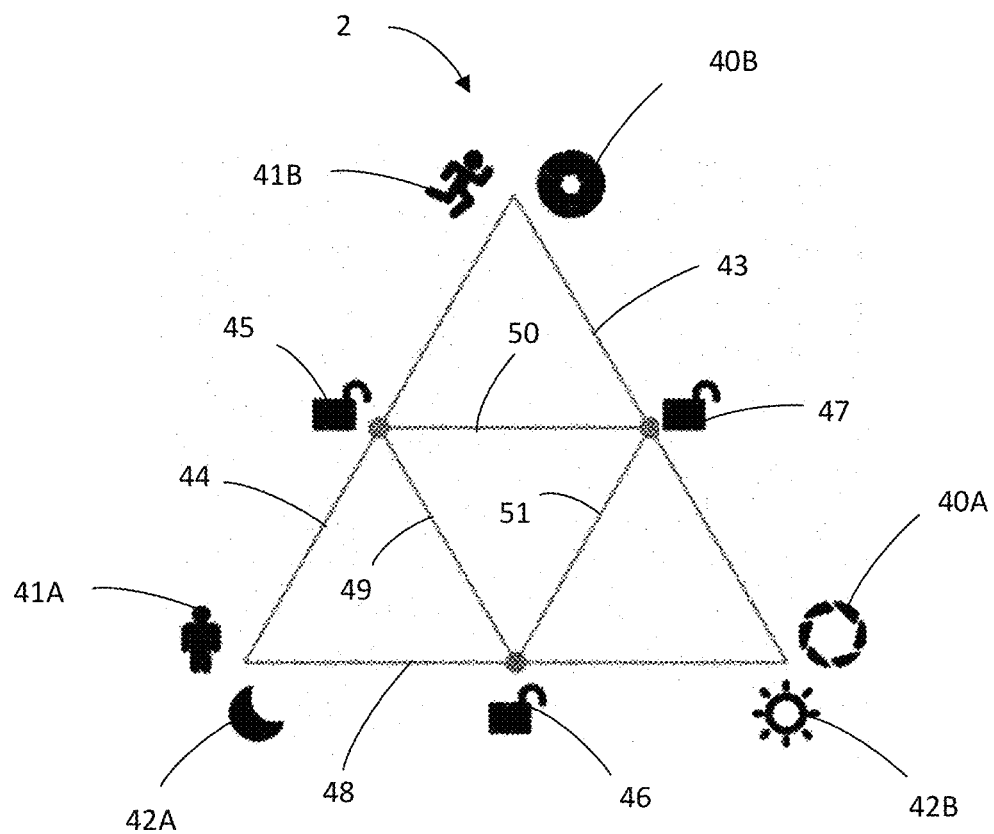
FIG. 4 is a specific representation of the new universal control interface for camera shown at FIG. 3.

Generally speaking, in a first embodiment shown at FIG. 3 and used at FIGS. 4-8, 14, and 17-18, three parameters are controlled (shutter speed, aperture, and ISO) and they are represented on an equilateral triangle. While one geometry is shown, one of ordinary skill will recognize that other geometries could be used. For example, at FIG. 15, a four parameter control system is shown using a square. FIG. 4 is a representation of the interface 2 without the other elements to help illustrate with greater clarity how the interface 2 can be shown.

Illustrations known to photographers can be used to help the user feel organically the interface. For example, an "open aperture" icon 40A can be place on the same side 43 as the "closed aperture" icon 40B to help a user understand that irrespective of the rest, the closer to the top of this triangle will be the effective choice, the smaller will be the aperture. Shutter speed for example is illustrated on the right side 44 of the interface 2 by displaying either a "static figure" 41A or a "running figure" 41B. Once again, a user will understand intuitively that the closer the dial is set to the top of the pyramid, the faster will be the shutter speed. Finally, the ISO parameter is represented on the bottom side 48 of the triangle by either a "moon" icon 42A which represents darkness to a "sun" icon 42B which represent light. Also illustrated are three middle lines 49, 50, 51 which serve to help the user easily see the location of each value as they change. As one value is moved, for example the aperture upwards, the dot will change location and the inner triangle will deform out of the equilateral position to a non-regular triangle. Also inserted are locks 45, 46, and 47, for each of the three value/sides 44, 43, and 48 respectively. If a user wants to "lock" the value into the current value, clicking on this lock on the appropriate side will result in fixing the value.

In one embodiment, the interface relies on auto-exposure and the local computer's offering of a triplet of initial set of parameters as the default configuration. As shown at FIG. 3, this default set is f/4, S=$1/125^{th}$ s, and 400 ISO. This allows a user to rely on the default value and speed up the process of using the new interface. The initial proposition can use all the advanced heuristics available today to guess the best parameters set, such as artificial intelligence, scene recognition, inertial sensors to detect blur. In yet another embodiment, the user will set these default parameters.

As illustrated by the icons of FIG. 4, if a user wants to change the depth of field, he/she must change the aperture 43. To change the motion blur, the user is invited to change the shutter speed 44. Finally, to change the depth of field and the speed at the same time, he/she will simply change the ISO 48.

The modified parameters is compensated automatically by the two others: if the shift if ⅔-stop on the aperture, the automatic shift will compensate by ⅓ stop on the 2 other parameters to keep the global exposure constant. The user interface shows the impact of the changes.

Figure 5A:
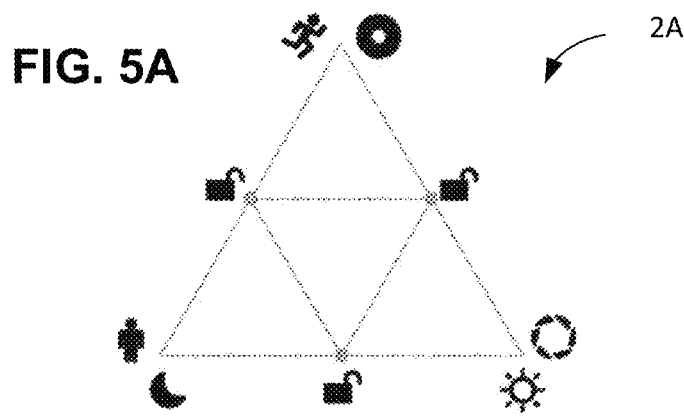
FIGS. 5A-5C are three consecutive illustrations of the new universal control interface for camera shown at FIG. 4 where a user varies the aperture parameter according to one embodiment of the present disclosure.
Figure 5B:
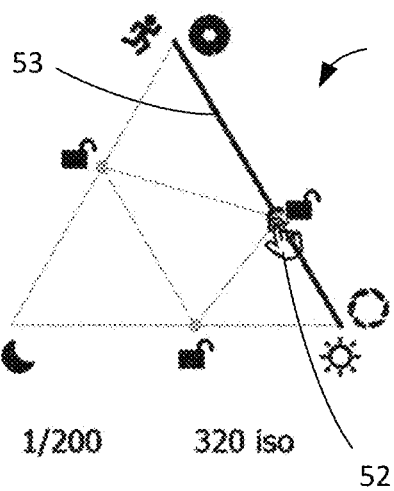
Figure 5C:
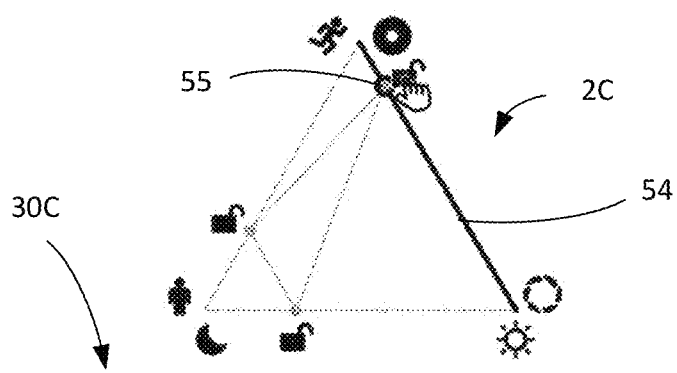

Turning to FIG. 5 broken down in three successive illustrations, FIG. 5A represents the "initial state" 2A, FIG. 5B represents a case where the user has moved the aperture level toward the wide aperture 2B. FIG. 5C represents the case where the user has moved the aperture level toward the closed aperture 2C. As part of FIG. 2A, the initial proposal from the auto-exposure is a tradeoff for the 3 dimensions. Each cursor is initialized in the center of the segment. The values of the 3 components is displayed, in this case f/4.0, $1/125$ and 400 ISO. As part of the move as shown at FIG. 5B, the aperture is moved down 52 down the line 53. The resulting values 30B are f/2.8, S=$1/200$, and 320 ISO. In essence, the user simply wanted to change the aperture from f/4 to f/2.8 but since the intention was to have less depth of filed, opening the iris will require the other parameters to compensate by reducing their respective contributions. As shown, both other values move one "click" to compensate where ISO moves from 400 to 320 and speed moves from $1/125$ to $1/200$. This is best illustrated by the inner triangle which moves along their respective lines.

FIG. 5C shows the case there instead of moving the aperture from f/4.0 to f/2.8, instead the aperture is closed by moving it up 55 the line 54 to a value of f/8.0. As shown by the inner triangular lines, the values of both the speed and the ISO adjust accordingly by moving away from the center toward the bottom left corner. The speed goes from $1/125$ to $1/60$ and the iso goes from 400 to 800 both to compensate accordingly. Once again, the goal is to transform a simple move in aperture to an intention. At FIG. 5B the intent is to have "less depth-of field" while the intention at FIG. 5C is to have "more depth-of field."

Figure 6A:
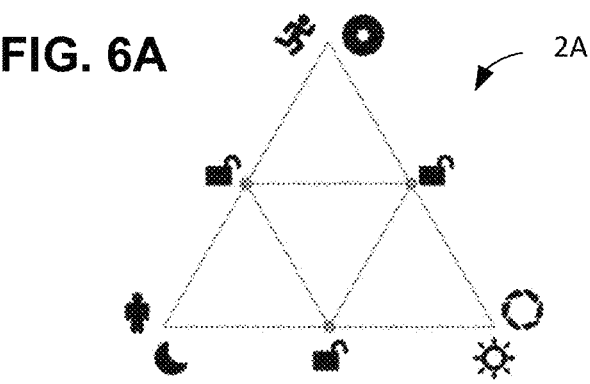
FIGS. 6A-6C are three consecutive illustrations of the new universal control interface for camera shown at FIG. 4 where a user varies the shutter speed parameter according to one embodiment of the present disclosure.
Figure 6B:
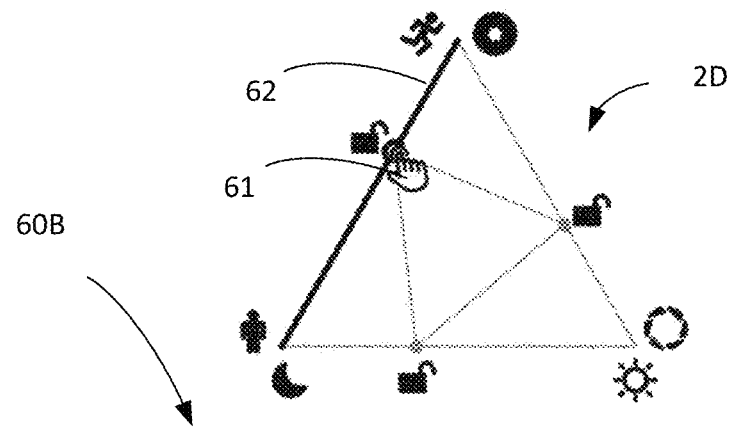
Figure 6C:
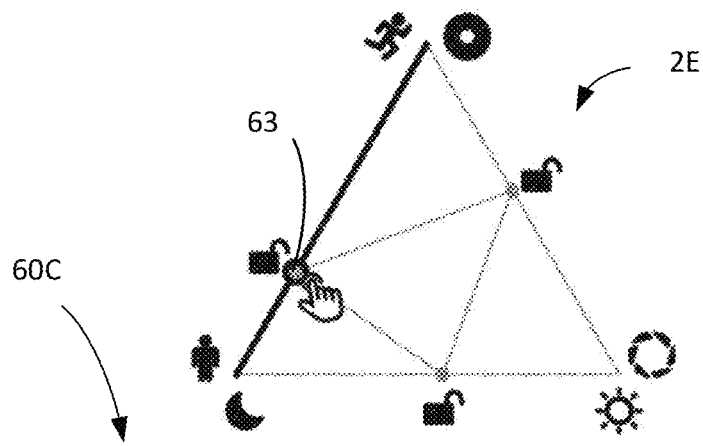

While FIG. 5 (FIGS. 5A-5C) described the situation where a person wishes to modify the depth of field by moving the aperture, by analogy FIG. 6 (FIGS. 6A-6C) relate to an intention to either add "blur" as shown at FIG. 6B or add "blur" as shown at FIG. 6C. The initial state is shown at FIG. 6A. This is shown as 2A and the original numbers offered are f/4.0, S=$1/125$, and ISO=400 at 60A. FIG. 6B shows how by moving the shutter speed up 61 on the blur line 62, the values change to f/3.2, S=$1/250$, and ISO=640. Once again, the values of the two non-modified axis self-correct to help the user obtain the desire effect of less blur (i.e. a target that moves). By analogy, FIG. 6C show the situation where more blur is desired and the parameters 60C then move to f/4.5, S=$1/60$, and ISO=320. As part of this situation, longer exposure time means more light and the other two parameters have to compensate by decreasing their contributions.

Figure 7A:
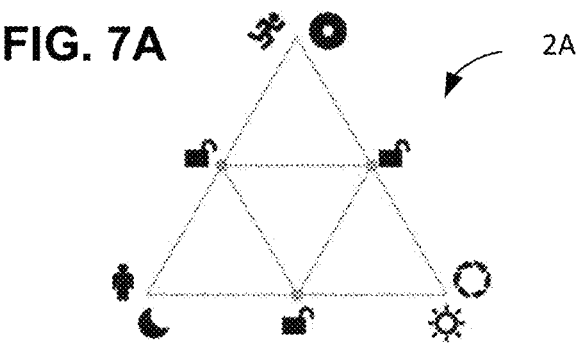
FIGS. 7A-7C are three consecutive illustrations of the new universal control interface for camera shown at FIG. 4 where a user varies the ISO parameter according to one embodiment of the present disclosure.
Figure 7B:
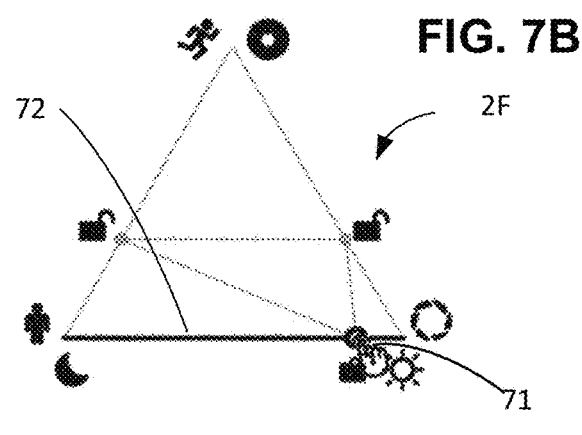
Figure 7C:
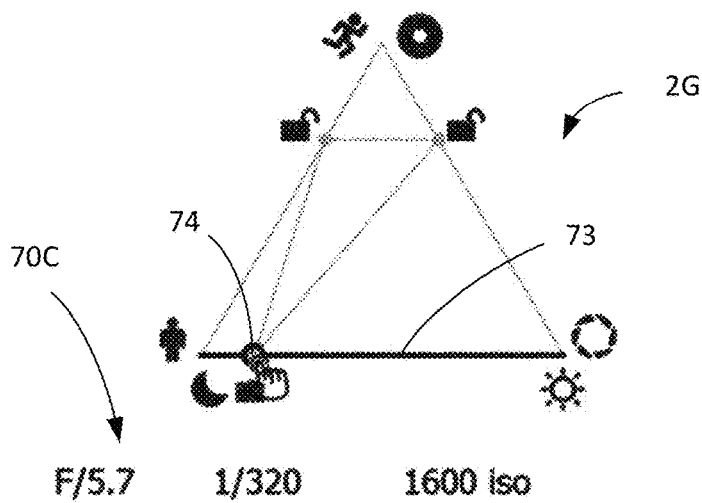

Moving to FIG. 7 (FIGS. 7A-7C), the initial set of condition 2A are shown at FIG. 7A and listed as 70A. In this case, the "intention" is one of having a less grainy image (See FIG. 7B) or a more grainy image in the mindset where I would rather limit blur (See FIG. 7C). As part of FIG. 7B, the ISO value is lowered to 100 to get less grainy as shown at 71 on line 72, the other two parameters move downward on the triangle to f/2.8 and S=$1/60$ to correct 70B. If the person changes the ISO value to 1600 to increase the grains on line 73 to the point 74, then values 70C then move to f/5.7 and S=$1/320$ to correct.

So the principle shown at FIGS. 5-7 bring several improvements. The user can directly act on the desired factor for a better picture, with the icons to give a direction directly and graphically. The user interface shows how the other parameters are compensating, by showing the link with the lines, and by showing the impact in terms of result (calm vs fast subject for speed, dark vs bright for grain, wide vs close for aperture), the system adapts. As a consequence of the new interface, a mode of correction which was single dimensional or single parameter-based (i.e. I am changing my aperture) now becomes linked with a change in feeling or impression of the image that requires all three parameters to be moved automatically. As part of this interface and change, moving a single parameter results in an automatic change in all three key parameters by default. The system is much faster and less time consuming.

In the above mode of operation (See FIGS. 5-7), the system automatically moves two of the three parameters when one is moved. In one embodiment, the locks 45, 46, and 47 shown at FIG. 4 can be used to avoid a three-parameter swing when the interface is used. For example, FIG. 8 shows as FIG. 8A the same initial state 2A with the same suggested set of parameters 80A. FIG. 8B shows how by clicking 2H on a point 81 the figures can be fixed. For example, the f/4.0 will be set. At FIG. 8C, the value is fixed 82 while the other two 83 can be moved. In this example, as a person moves toward a faster speed of $1/500$ the adjustment to compensate will only happen as to the non-locked element, namely the ISO will slide to 1280 as shown at 80C.

The user can still move the locked parameter to a desired value. It replaces the A, S, M modes. If he locks and possibly moves the aperture, he gets an equivalent of the Aperture priority mode augmented with the ability to change the distribution between the speed and the ISO. If he locks and possibly moves the speeds, he gets an equivalent of the Shutter speed priority mode augmented with the ability to change the distribution between the speed and the ISO. This way, the user can completely control the exposure with a unique graphical component. Beginners can understand how the exposure is composed of the 3 contributions, and see their interaction with the dynamic animations.

Next, what is described is a physical controller. To help give context, FIG. 11 shows a normal ordinary camera where the aperture function is often found on the lens 112 and by rotating leftward or rightward, the number is varied. On top of the camera are often two buttons 110 and 111 depending on models. FIG. 12 shows a close up view of the different pre-programmed functions of the normal camera 120. FIG. 13 shows a button 130 where the EV values are changed via a wheel. Returning to FIGS. 9-10, the previous examples were illustrated by a 2D controller on a screen operated by tap and swipe movements from the finger. Some digital cameras, and some photographers are often used to operate with dials and crowns. The same interface may be operated using a touch sensitive wheel (like on original iPod music players) tracking the position of the finger. Those wheels also have clicks on central position and on 4 or 8 directions. Markers 91, 92, and 93 show the direction of change and on each side the same illustrations 91A, 91B, 92A, 92B, and 93A, and 93B can be pressed or moved accordingly. Using a swipe or a thumb action on the wheel or buttons placed below these different elements, the interface 2 can be modulated 90 and the above changes can be described. Also, the lock feature can be included as part of light or by pushing down on an element.

With the same features we can replace the triangle by this wheel and keep the swipe and lock features. The user will see the values change in the viewfinder, on overlay on electronic viewfinders (screens on compact and hybrid/mirrorless cameras), on the side on optical (DSLR). So a DSLR, an hybrid or a compact camera, can be operated with the same principle with 2 different physical controls, either with its touch screen on the back with any finger (more probably one index), or with the click+wheel with the thumb while the eye is on the viewfinder. As shown at FIG. 10, instead of three parameters, the same wheel 100 can include a fourth element 101 with the same buttons 101A and 101B. When the control (wheel or triangle) is used on a camera using an electronic viewfinder, the user might also see the result immediately on the image: the changes on every dimension can be applied on the aperture (visible with the depth of field), ISO (grain) or speed (banding, . . . ).

Figure 14:
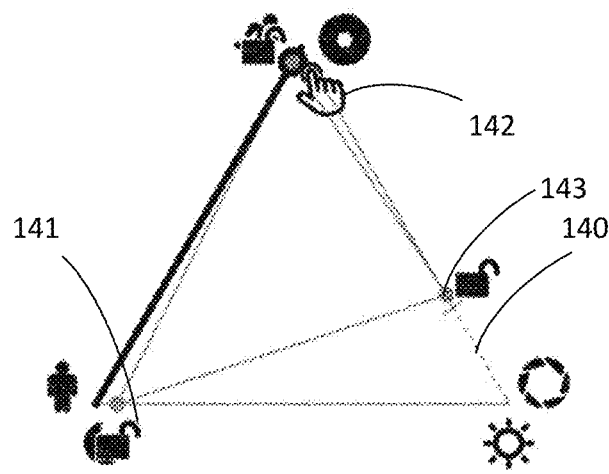
FIG. 14 is an illustration of self-regulation of the interface as shown at FIG. 4.

In another embodiment, most of the cameras have either software or hardware limitations. They let the user define a maximum ISO. Some allow user to set the aperture as a minimum value (ex: F/2.8) and a maximum (F/22). In regards to the shutter speed, the shutter speed is also limited between two extremes, namely ⅛₀₀₀ s to 15 s. The current disclosures and interface 2 can be adapted to support such limitations. For example, FIG. 14, the user moves the speed to ¹⁄₁₀₀₀ s (3 stops: /125→¹⁄₂₅₀→¹⁄₅₀₀→¹⁄₁₀₀₀) as 142, under normal circumstances, the system would then spread of a total of 3 stops (i.e. 1.5 stop) on both the aperture and the ISO sides of the triangle. Since the aperture is limited to f/2.8 by the lens manufacturer as a limit, so only 1 shift/stop can be applied on the aperture moving it from f/4 to f/2.8, so the 2 stops left are reported on the ISO moving the value from ISO 400 to 1600 ISO. FIG. 14 shows these different steps.

Figure 15:
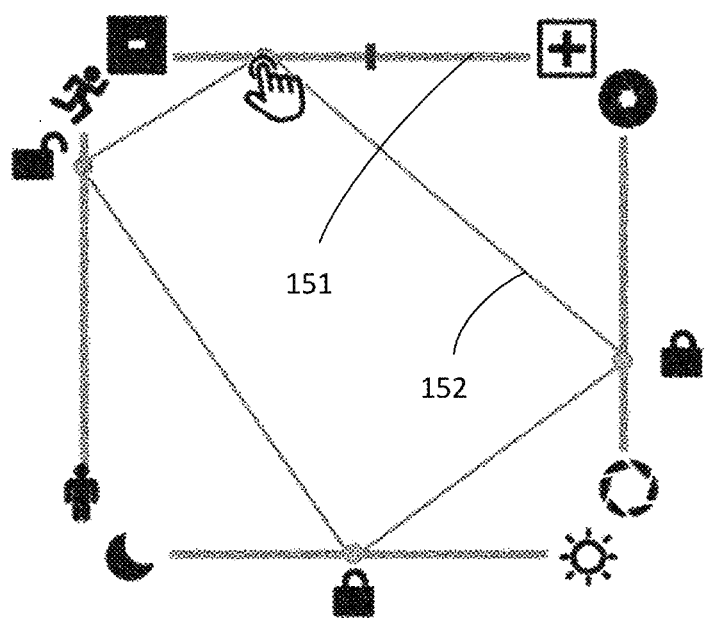
FIG. 15 is a specific representation of the new universal control interface for camera shown at FIG. 3, where the interface instead of having three parameters also includes a fourth parameter according to an embodiment of the present disclosure.

Referring back to FIG. 10, the interface 2 illustrated generally because of three parameters using a triangle on FIGS. 3-9 (ISO, Shutter Speed, and Aperture). One other embodiment includes a fourth parameter known at exposure value (EV). What is shown at FIG. 15 is a square with four sides where a fourth side 151 includes the EV value illustrated with the signs "plus" or "minus." These symbols as shown on FIG. 15 also align with the symbols shown as elements 101A and 101B on FIG. 10. This value of EV is also shown at FIG. 13 when implemented on a camera with a dial 130.

A lot of cameras propose a physical controller for the exposure compensation (or correction). It is usually very easy/fast to access to change the global exposure, since the auto-exposure sometimes bring a "too gray" image, for pictures on snow, we often over-expose, for sunsets we under-expose. So exposure correction is very often used, it is a real important parameter. The correction also impacts the 3 other exposure parameters described above. For example, if we want to add+1 stop to the global exposure, we can naturally add ⅓-stop to each of the 3 parameters in a proportional displacement/adjustment.

This additional dimension 151 is not impacted if we move one of the aperture/speed/ISO, those 3 are distributed. But if we change the EV correction, the 3 others are changed. On the behavior side, the EV compensation works as if it was locked, without needing the lock icon. So the invention offers the full override on the proposed exposure with one single component bringing on top of the automatic proposal of the global exposure and distribution of the 3 contributions, the mean to interact according to his intention, the ability to lock/unlock one component to apply the shift on the others, and a gain in space on the body of a camera, with more fine control (⅓-stops vs usually 1-stop resolution). Also, visual display is intuitive and easy to understand.

In another embodiment, the interface can be used as the "manual" or "M" mode. By having four parameters instead of three, when two are locked, for example the ISO and the aperture, we can't move the speed anymore without changing the exposure. With the 4 parameters display, if the user moves the speed, the exposure will be moved automatically. Ex: (¹⁄₁₂₅ s, f/4, 400 iso), lock on f/4 and 400 iso. If the user moves the speed, it is equivalent into going into Manual mode with manual ISO, in that case the exposure will be corrected. In the example, the top segment will show the effect of the movement of the speed on the exposure. On the other hand, moving the exposure compensation will move the speed accordingly, since the aperture and the ISO are locked. This situation is shown at FIG. 15 where both of the locks on the right and the bottom are locked and the user can only move the other two parameters.

Figure 16:
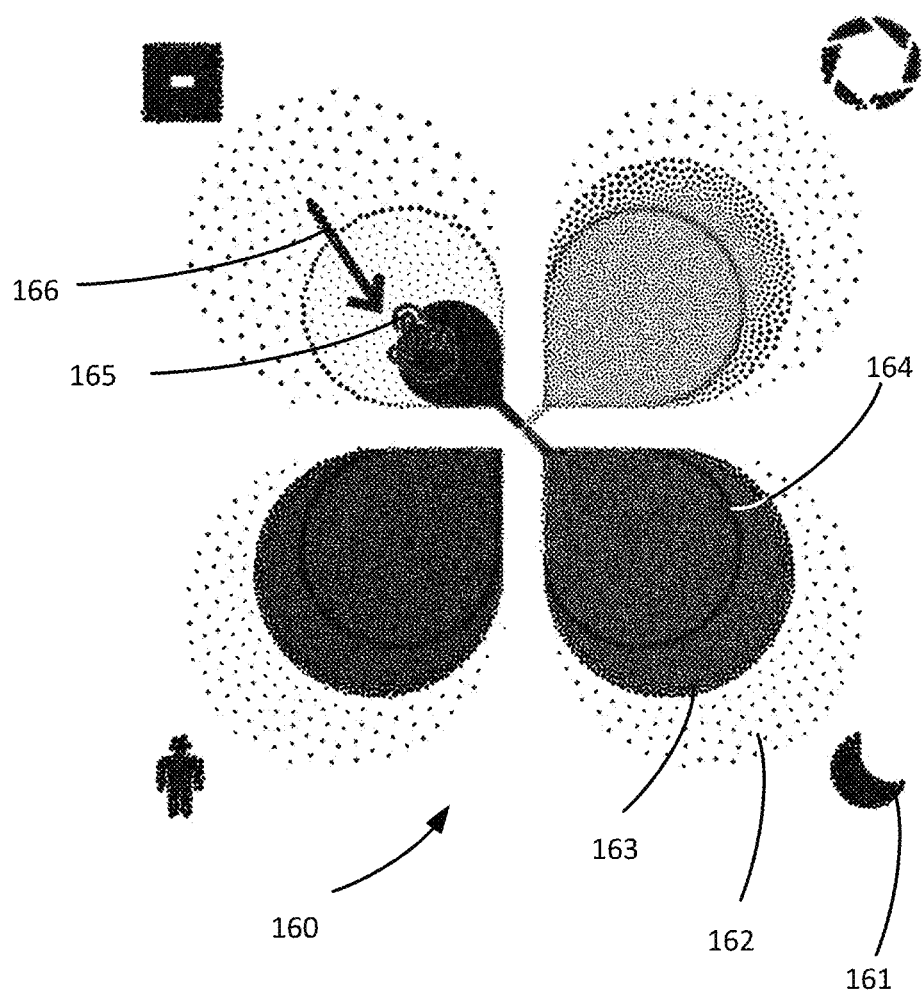
FIG. 16 is a butterfly and color representation of the interface for the new universal control interface for camera shown at FIG. 15 represented in a different way.

At FIG. 16, what is shown is a different visual representation in the shape of a clover with four leaves. For example, as shown by the hand 165 this can be a touch screen interface 160. On a touch screen (for example a camera screen or an iPhone App interface), the distribution between the 4 components of the exposure can be represented as communicating vessels: the exposure is represented as the colored surface of each component. When the user moves one of the components, we see that the others inflate or reduce to compensate to keep the global surface constant, like communicating vessels. In this second interface, a single parameter icon can be used 161 to illustrate the feature and middle lines can be used to illustrate the connection between these "vessels." What is shown with arrow 166 is how the hand can increase or reduce the EV value 165. This might increase or decrease the other three values shown at their middle points. Lines 164, 162 are shown.

Figure 17:
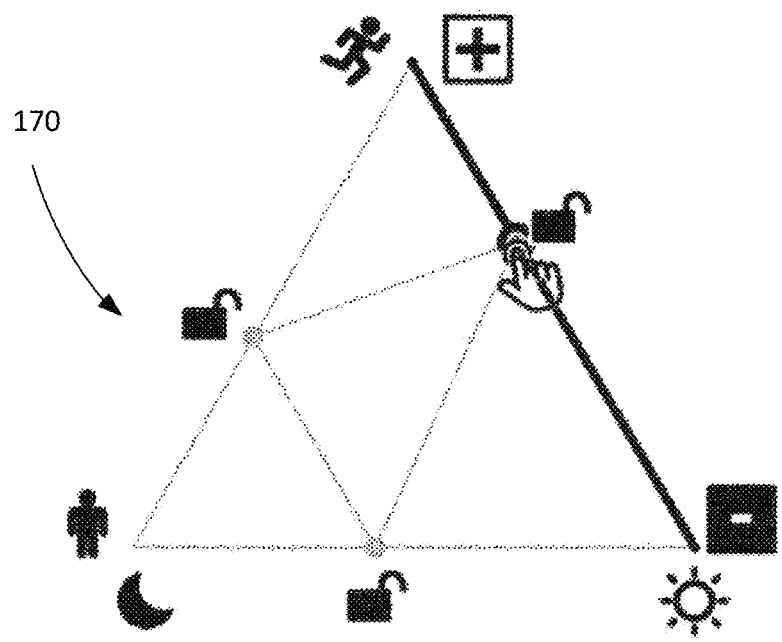
FIG. 17 is a three parameter representation of the new universal control interface for camera shown at FIG. 15 where the aperture is a fixed and non variable value, according to an embodiment of the present disclosure.
Figure 18:
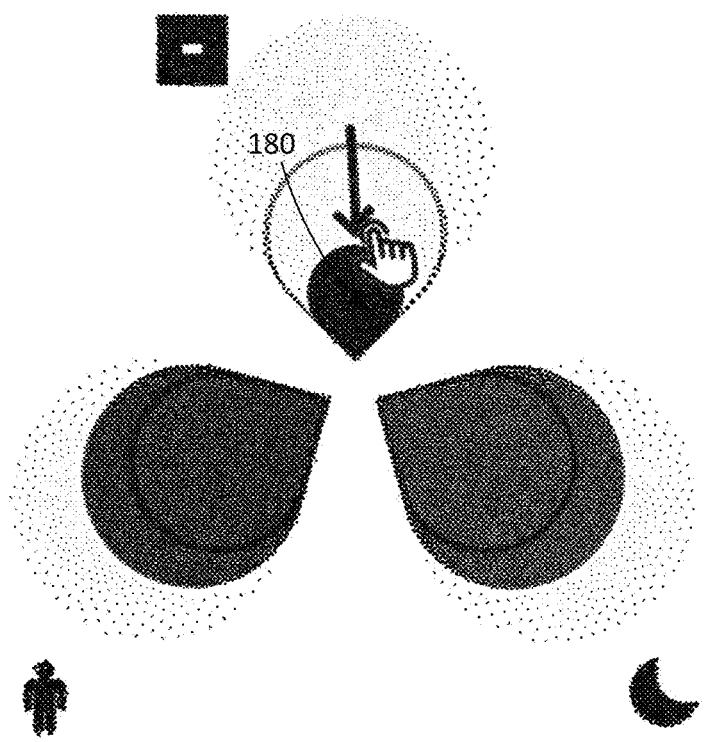
FIG. 18 is a butterfly and color representation of the interface for the new universal control interface for camera shown at FIG. 17.

Finally, at FIG. 17, the inventor recognizes that in some cases like action cameras like a GoPro® or even smartphones, these cameras have a fixed aperture and therefore there is no need for displaying this element. As a consequence, 170 shows the four parameter system of FIG. 15 where the aperture has been removed and only the shutter speed, the ISO and the EV are placed on a three axis diagram. FIG. 18 illustrates the same using the clover interface shown also at FIG. 16. While a handful of structures are offered, one of ordinary skill in the art will understand these concepts can be applied and used as part of other interfaces.

A system called the Additive System of Photographic Exposure (APEX) is a 1960 ASA standard for monochrome film speed, ASA PH 2/5-1960 is a means used of simplifying exposure computation. The Wikipedia page on the APEX system (https://en.wikipedia.org/wiki/APEX_system) is incorporated hereby by reference.

We can express the 3 exposure components in a "stop"/Exposure Value (EV) scale. The EV scale is the $\log_2$ of the luminance expressed in lux. Taking base-2 logarithms of both sides of the exposure equation and separating numerators and denominators reduces exposure calculation to a matter of addition: Ev=Av+Tv=Bv+Sv, where Av is the aperture value: Av=$\log_2$ (Aperture$^2$), Tv is the time value: Tv=$\log_2$ (1/T), T is the exposure time in seconds, Ev is the exposure value: Ev=Av+Tv, Sv is the speed value (aka sensitivity value): Sv=$\log_2$ (N Sx). Typically, this refers to $\log_2$ (ISO/base sensitivity). The "speed' refers to the speed of the analog film (400 ASA, . . . ). By is the luminance value (aka brightness value): Bv=$\log_2$ (B/N K).

So Av+Tv=Bv+Sv can be expressed as Bv=Av+Tv−Sv, e.g. that the brightness value of the scene (Bv) is the addition of the contributions of the aperture (Av), the shutter speed (Tv) and the ISO sensitivity (Sv). This means that the sum is constant. The By is the luminance of the scene, so we see that for a constant scene, Bv is constant, so if we want to change the contribution aperture Av. So if the user shifts the aperture by an offset of dAv (Av_new=Av_orig+dAv), we need to distribute equally the offset on Tv and Sv: we compute Tv_new=Tv_orig−dAv/2, and Sv_new=Sv_orig+dAv/2.

This way Av_new+Tv_new−Sv_new=(Av_orig+dAv)+(Tv_orig−dAv/2)−(Sv_orig+dAv/2)=Av_orig+Tv_orig−Sv_orig=Bv, the global exposure does not change. If Sv is locked, the offset dAv is reported only on Tv: Tv_new=Tv_orig−dAv. If the user wants to add 1-stop of over-exposure on the EV correction, the By will be decreased by 1 stop, so the Av, Tv, Sv will compensate each by changing their value by ⅓-stop.

Figure 19:
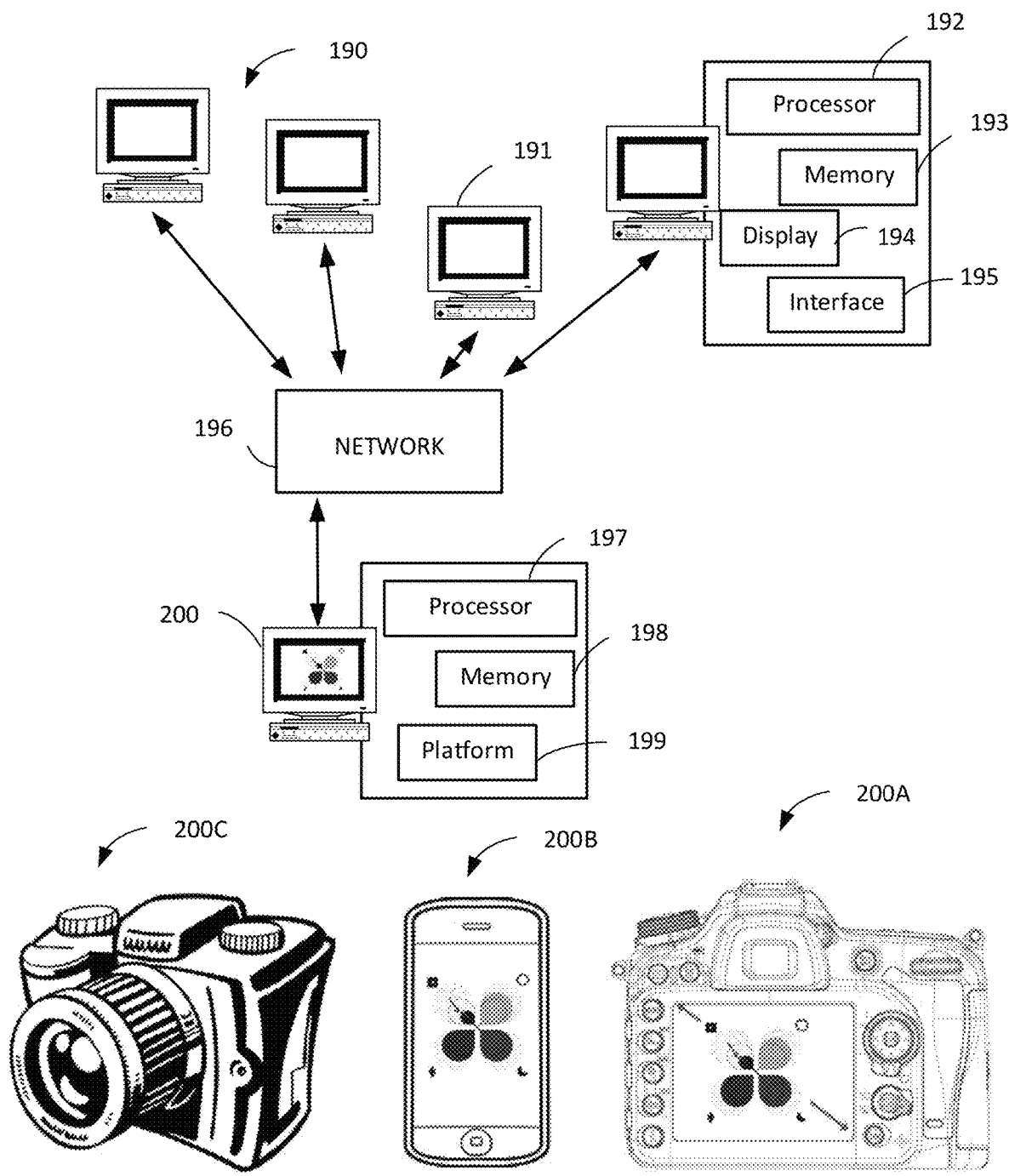
FIG. 19 is a schematic representation of an online system where one or more devices are connected directly or wirelessly via a network where these devices include the interface for the new universal control interface for camera shown in this disclosure.

FIG. 19 is offered generally to remind the reader how interface technology can be implemented in today's wide range of online and portable systems. This invention is no place to explain the internet, software programming and how apparatus can be built with onboard software and displays, but as way of enabling disclosure, FIG. 19 shows a system 190 with a central network 196, such as for example the internet where a multiple number of devices 191 are connected. Each device 191 has for example a processor 192, a memory 193 where software can reside or can execute connected and powered by the processor 192. A display 194 such as a screen is found on each of these devices and on them an interface 195 with a user for example a keyboard, or other sensors/mouse or touch screen. As used here, the term interface is not a software interface as described above.

FIG. 19 also suggests that one device 200 can be connected or remove and includes a processor 197, a memory for executing a program 198 and a platform 199 namely the software/system or programming interface as shown above at FIG. 3 and up. One of ordinary skill in the art will recognize that at 200C is shown a camera and 200A shows the back of the camera where a screen can be found that will include, for example the interface described above as part of the invention. Also shown at 200B is an illustration of a portable device where the interface can be added. In today's world, most software are wirelessly connected via the network 196 to interact with remote devices. For example, the new iWatch has a display that connects via an App to the camera of a cell phone.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified It is understood that the preceding is merely a detailed description of some examples and embodiments of the present invention and that numerous changes to the disclosed embodiments can be made in accordance with the disclosure made herein without departing from the spirit or scope of the invention. The preceding description, therefore, is not meant to limit the scope of the invention but to provide sufficient disclosure to one of ordinary skill in the art to practice the invention without undue burden.

What is claimed is:

1. A method of controlling photography and videography parameters of an image capturing device having an electronic display, the method comprising:
    displaying a first indicator in one of a plurality of locations in an aperture display region, each location in the aperture display region corresponding to an aperture opening value along a static aperture axis, the first indicator quantifying the aperture opening value associated with the image capturing device;
    displaying a second indicator in one of a plurality of locations in a shutter speed display region, each location in the shutter speed display region corresponding to a shutter speed value along a static shutter speed axis, the second indicator quantifying the shutter speed value associated with the image capturing device; and
    displaying a third indicator in one of a plurality of locations in an ISO display region, each location in the ISO display region corresponding to an ISO value along a static ISO axis, the third indicator quantifying the ISO value associated with the image capturing device;
    wherein the image capturing device is configured to:
    automatically adjust the second and third indicators based on a user adjustment to the first indicator;
    automatically adjust the first and third indicators based on a user adjustment to the second indicator; and
    automatically adjust the first and second indicators based on a user adjustment to the third indicator; and
    wherein the image capturing device is configured to automatically adjust the second and
    third indicators based on a user adjustment to the first indicator by:
    calculating a value dAv, where dAv is the difference between the aperture value quantified by the first indicator before the user adjustment and the aperture value quantified by the first indicator after the user adjustment;
    subtracting one half of dAv from the shutter speed value to calculate a new shutter speed value;
    adding one half of dAv to the ISO value to calculate a new ISO value;
    adjusting the second indicator to reflect the new shutter speed value; and
    adjusting the third indicator to reflect the new ISO value.

2. The method of claim 1 wherein the electronic display is superimposed over a live image displayed by the image capturing device.

3. The method of claim 1 wherein the aperture, shutter speed, and ISO display regions comprise an equilateral triangle.

4. The method of claim 1, further comprising:
displaying a fourth indicator in one of a plurality of locations in an exposure display region, each location in the exposure display region corresponding to an exposure value along a static aperture axis, the fourth indicator quantifying the exposure value associated with the image capturing device; and
calculating the exposure value as the sum of Av and Tv, where Av is the aperture value and Tv is the shutter speed value.

5. The method of claim 1 wherein the user adjustment to the first, second, and third indicators is performed on a tactile screen.

6. The method of claim 1 wherein the user adjustment to the first, second, and third indicators is performed on a touch sensitive wheel.

7. A method of controlling photography and videography parameters of an image capturing device having an electronic display, the method comprising:
displaying a first indicator in one of a plurality of locations in an aperture display region, each location in the aperture display region corresponding to an aperture opening value along a static aperture axis, the first indicator quantifying the aperture opening value associated with the image capturing device;
displaying a second indicator in one of a plurality of locations in a shutter speed display region, each location in the shutter speed display region corresponding to a shutter speed value along a static shutter speed axis, the second indicator quantifying the shutter speed value associated with the image capturing device; and
displaying a third indicator in one of a plurality of locations in an ISO display region, each location in the ISO display region corresponding to an ISO value along a static ISO axis, the third indicator quantifying the ISO value associated with the image capturing device;
wherein the image capturing device is configured to:
automatically adjust the second and third indicators based on a user adjustment to the first indicator;
automatically adjust the first and third indicators based on a user adjustment to the second indicator; and
automatically adjust the first and second indicators based on a user adjustment to the third indicator; and
wherein the image capturing device is configured to automatically adjust the first and third indicators based on a user adjustment to the first indicator by:
calculating a value dTv, where dTv is the difference between the shutter speed value quantified by the second indicator before the user adjustment and the shutter speed value quantified by the second indicator after the user adjustment;
subtracting one half of dTv from the aperture value to calculate a new aperture value;
adding one half of dTv to the ISO value to calculate a new ISO value;
adjusting the first indicator to reflect the new aperture value; and
adjusting the third indicator to reflect the new ISO value.

8. The method of claim 7 wherein the electronic display is superimposed over a live image displayed by the image capturing device.

9. The method of claim 7 wherein the aperture, shutter speed, and ISO display regions comprise an equilateral triangle.

10. The method of claim 7, further comprising:
displaying a fourth indicator in one of a plurality of locations in an exposure display region, each location in the exposure display region corresponding to an exposure value along a static aperture axis, the fourth indicator quantifying the exposure value associated with the image capturing device; and
calculating the exposure value as the sum of Av and Tv, where Av is the aperture value and Tv is the shutter speed value.

11. The method of claim 7 wherein the user adjustment to the first, second, and third indicators is performed on a tactile screen.

12. The method of claim 7 wherein the user adjustment to the first, second, and third indicators is performed on a touch sensitive wheel.

13. A method of controlling photography and videography parameters of an image capturing device having an electronic display, the method comprising:
displaying a first indicator in one of a plurality of locations in an aperture display region, each location in the aperture display region corresponding to an aperture opening value along a static aperture axis, the first indicator quantifying the aperture opening value associated with the image capturing device;
displaying a second indicator in one of a plurality of locations in a shutter speed display region, each location in the shutter speed display region corresponding to a shutter speed value along a static shutter speed axis, the second indicator quantifying the shutter speed value associated with the image capturing device; and
displaying a third indicator in one of a plurality of locations in an ISO display region, each location in the ISO display region corresponding to an ISO value along a static ISO axis, the third indicator quantifying the ISO value associated with the image capturing device;
wherein the image capturing device is configured to:
automatically adjust the second and third indicators based on a user adjustment to the first indicator;
automatically adjust the first and third indicators based on a user adjustment to the second indicator; and
automatically adjust the first and second indicators based on a user adjustment to the third indicator; and
wherein the image capturing device is configured to automatically adjust the first and second indicators based on a user adjustment to the third indicator by:
calculating a value dSv, where dSv is the difference between the ISO value quantified by the third indicator before the user adjustment and the ISO value quantified by the third indicator after the user adjustment;
adding one half of dSv to the shutter speed value to calculate a new shutter speed value;
adding one half of dSv to the ISO value to calculate a new ISO value;
adjusting the first indicator to reflect the new aperture value; and adjusting the second indicator to reflect the new shutter speed value.

14. The method of claim 13 wherein the electronic display is superimposed over a live image displayed by the image capturing device.

15. The method of claim 13 wherein the aperture, shutter speed, and ISO display regions comprise an equilateral triangle.

16. The method of claim 13, further comprising:
- displaying a fourth indicator in one of a plurality of locations in an exposure display region, each location in the exposure display region corresponding to an exposure value along a static aperture axis, the fourth indicator quantifying the exposure value associated with the image capturing device; and
- calculating the exposure value as the sum of Av and Tv, where Av is the aperture value and Tv is the shutter speed value.

17. The method of claim 13 wherein the user adjustment to the first, second, and third indicators is performed on a tactile screen.

18. The method of claim 13 wherein the user adjustment to the first, second, and third indicators is performed on a touch sensitive wheel.

\* \* \* \* \*